(12) United States Patent
Mickler et al.

(10) Patent No.: US 10,305,282 B2
(45) Date of Patent: May 28, 2019

(54) INITIATING A CONTROL FUNCTION BASED ON REAL TIME AVAILABLE FAULT CURRENT MEASUREMENT

(71) Applicant: Rockwell Automation Technologies, Inc., Mayfield Heights, OH (US)

(72) Inventors: Kurt R. Mickler, Waukesha, WI (US); David C. Mazur, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 196 days.

(21) Appl. No.: 15/492,796

(22) Filed: Apr. 20, 2017

(65) Prior Publication Data

US 2018/0309290 A1  Oct. 25, 2018

(51) Int. Cl.
*H02J 3/12*    (2006.01)
*H02J 13/00*   (2006.01)
*G05B 19/042*  (2006.01)

(52) U.S. Cl.
CPC .............. *H02J 3/12* (2013.01); *G05B 19/042* (2013.01); *H02J 13/0017* (2013.01); *G05B 2219/2639* (2013.01)

(58) Field of Classification Search
CPC ........ H02J 3/12; H02J 13/0017; G05B 13/041
See application file for complete search history.

(56) References Cited

U.S. PATENT DOCUMENTS

| 7,164,275 B2 | 1/2007 | Gasperi | |
| 2008/0265912 A1* | 10/2008 | Gasperi | G01R 27/04 324/652 |
| 2012/0095709 A1* | 4/2012 | Smith | G01R 31/025 702/65 |
| 2013/0066478 A1* | 3/2013 | Smith | H02H 3/006 700/293 |
| 2015/0369217 A1* | 12/2015 | Gupta | H02J 3/16 290/44 |
| 2016/0146710 A1* | 5/2016 | Nair | G05B 9/02 702/183 |
| 2017/0097615 A1* | 4/2017 | Mazur | G05B 11/01 |
| 2018/0123387 A1* | 5/2018 | Totani | H02J 9/061 |

* cited by examiner

*Primary Examiner* — Thomas C Lee
*Assistant Examiner* — Michael Tang
(74) *Attorney, Agent, or Firm* — Kunzler Bean & Adamson

(57) ABSTRACT

For initiating a control function based on a real time available fault current measurement, a measurement module measures an operating voltage, a short voltage, and a ring parameter of alternating current power lines. A processor calculates an impedance of the power lines as a function of the operating voltage, the short voltage, and the ring parameter. The processor further calculates a dynamic available fault current as a function of the impedance. In addition, the processor initiates a control function based on the available fault current.

18 Claims, 16 Drawing Sheets

INITIATING A CONTROL FUNCTION BASED ON REAL TIME AVAILABLE FAULT CURRENT MEASUREMENT

BACKGROUND INFORMATION

The subject matter disclosed herein relates to initiating a control function based on a real time available fault current measurement.

BRIEF DESCRIPTION

An apparatus for initiating a control function based on a real time available fault current measurement is disclosed. The apparatus includes a measurement module and a processor. The measurement module measures an operating voltage, a short voltage, and a ring parameter of Alternating Current (AC) power lines. The processor calculates an impedance of the power lines as a function of the operating voltage, the short voltage, and the ring parameter. The processor further calculates a dynamic available fault current as a function of the impedance. In addition, the processor initiates a control function based on the available fault current.

A method for initiating a control function based on a real time available fault current measurement is disclosed. The method measures an operating voltage, a short voltage, and a ring parameter of AC power lines. The method further calculates, by use of a processor, an impedance of the power lines as a function of the operating voltage, the short voltage, and the ring parameter. The method calculates a dynamic available fault current as a function of the impedance. In addition, the method initiates a control function based on the available fault current.

A system for initiating a control function based on a real time available fault current measurement is also disclosed. The system includes a power distribution system, a measurement module, and a processor. The power distribution system includes a supply and a plurality AC power lines. The measurement module measures an operating voltage, a short voltage, and a ring parameter of first power lines. The processor calculates an impedance of the first power lines as a function of the operating voltage, the short voltage, and the ring parameter. The processor further calculates a dynamic available fault current as a function of the impedance. In addition, the processor initiates a control function based on the available fault current.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
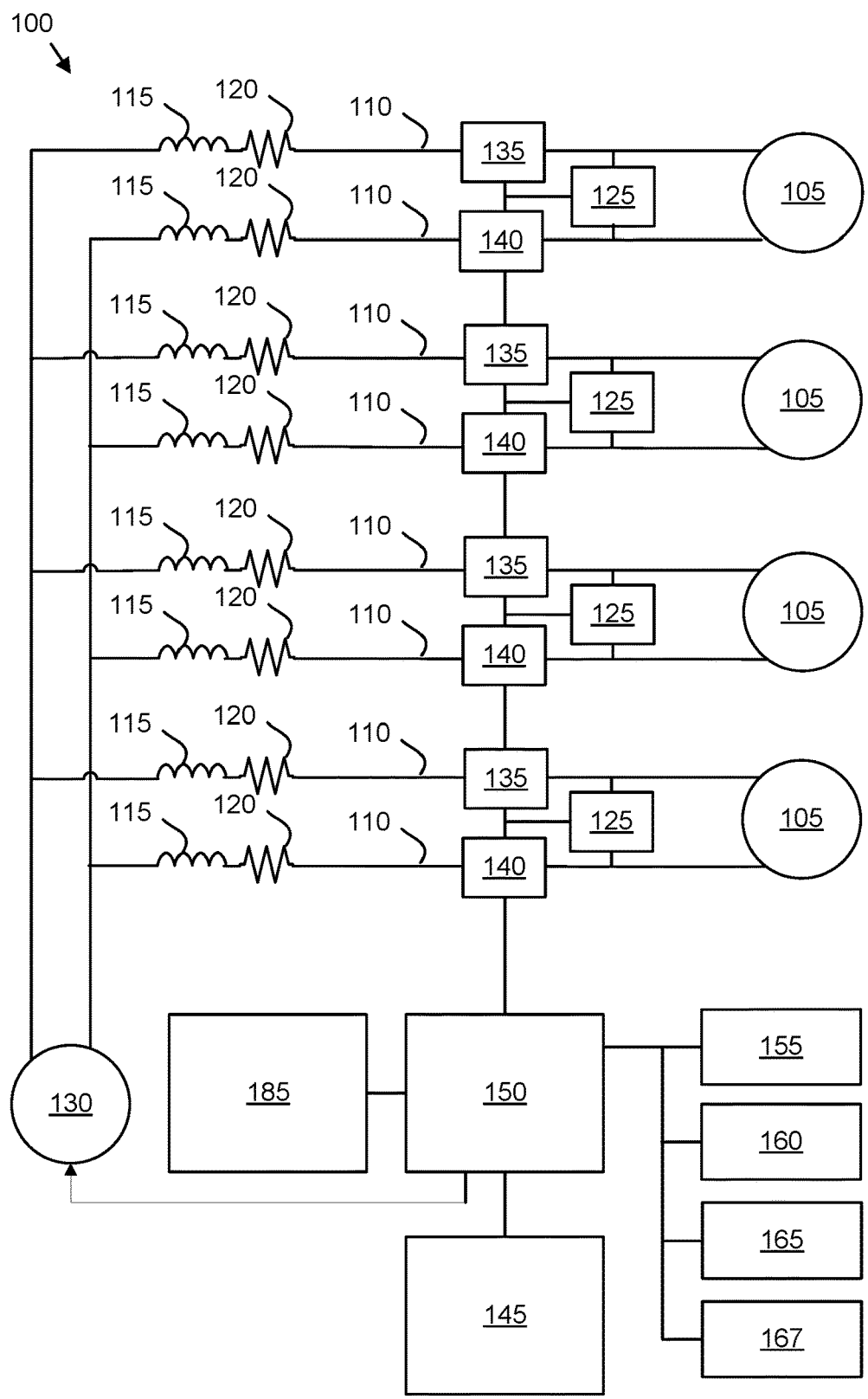
FIG. 1A is a schematic block diagram of a power distribution system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object-oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general-purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1A is a schematic diagram illustrating one embodiment of a power distribution system 100. The system 100 may supply power to one or more loads 105. The loads 105 may include motors, fabrication equipment, process controllers, valves, and the like. In the depicted embodiment, the system 100 includes one or more Alternating Current (AC) power lines 110 that supply power to the load 105. Each power line 110 may include a reactance 115 and a resistance 120 that are intrinsic and/or extrinsic to the power line 110. In one embodiment, the power lines 110 include a switch 135 that connects and/or disconnects the power line 110 to the load 105. In addition, the power lines 110 may include a breaker 140 that disconnects the power line 110 from the load 105.

Each power line 110 may include one or more measurement modules 125. The measurement module 125 may measure an operating voltage, a short voltage, and a ring parameter of the power lines 110 as will be described hereafter.

In one embodiment, the system 100 includes a system controller 150, a current-using event database 185, a measurement database 145, an alarm 155, a warning 160, a lockout 165, and a display 167. The system controller 150 may be a programmable logic controller, a power network controller, a process network controller, and the like. The controller 150 may calculate the reactance 115 and resistance 120 of the power line 110 as a function of the operating voltage, the short voltage, and the ring parameter. The controller 150 may further calculate a dynamic available fault current (AFC) as a function of the reactance 115 and/or resistance 120. As a result, the dynamic AFC may be available in real time.

In the past, AFC related protections and controls have been based on static AFC estimates. As a result, the elements of the power distribution system 100 must be designed to cope with worst-case AFC, greatly increasing the cost of the system 100. In addition, because the AFC has only been estimated, control functions for the power distribution system 100 are typically very conservatively designed, further increasing cost and restricting performance.

The embodiments described herein initiate one or more control functions based on the calculated AFC as will be described hereafter. As a result, the power distribution system 100 may function safely and efficiently with less expensive components and with greater control of the system 100.

In one embodiment, the control function comprises one or more of the alarm 155, the warning 160, and the lockout 165. For example, the alarm 155 may be activated in response to the AFC exceeding an alarm threshold. The alarm 155 may be one or more of a visual alarm and an audio alarm. In addition, the warning 160 may be activated in response to the AFC exceeding the warning threshold. The warning 160 may be an indicator. Alternatively, the warning 160 may comprise communicating a warning message.

The lockout 165 may lockout one or more instances of equipment. The lockout 165 may be activated in response to the AFC exceeding a lockout threshold. In one embodiment, the control function comprises communicating the AFC to a display 167. For example, the display 165 may present the real-time AFC.

In one embodiment, the AFC, the operating voltage, the short voltage, the ring parameter, the reactance 115, and the resistance 120 are stored in the measurement database 145. In addition, one or more current-using events may be stored in the current-using event database 185. The measurement database 145 and the current-using event database 185 may be used to determine a current usage model of current-using events as a function of the AFC. The control function may be based on the AFC and the current usage model as will be described hereafter. As will be shown, the AFC can be used to initiate one or more of a variety of control functions.

Figure 1B:
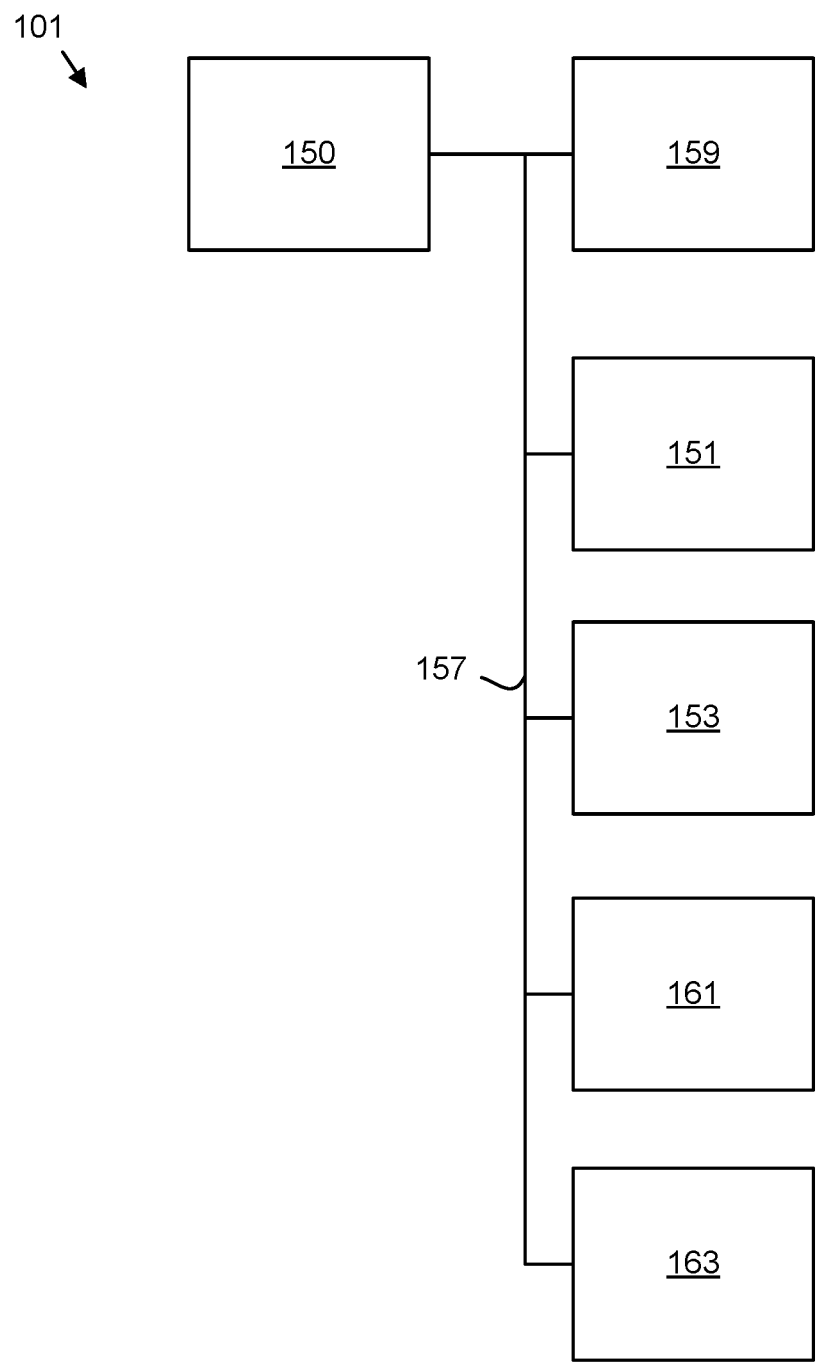
FIG. 1B is a schematic block diagram of an industrial automation control network according to an embodiment.

FIG. 1B is a schematic block diagram of an industrial automation control network 101 according to an embodiment. The industrial automation control network 101 may employ the calculated AFC. In the depicted embodiment, the industrial automation control network 101 includes the system controller 150, an add-on profile 159, a process controller 151, a power monitor 153, one or more industrial devices 161, power distribution equipment 163, and a network 157.

The network 157 may employ a networked communication protocol comprising one or more of IEC 61580 MMS, GOOSE, SV, DNP 3.0, IEC 60870-5, Modbus TCP, EtherNet/IP, and DeviceNet. Communication between devices may be via the network 157 and/or via a hardwire interface. The control function may employ the network 157 to control one or more devices, processes, and/or interfaces. In one embodiment, the control function controls using Class 1 and Class 3 message schemes.

The control function may provide closed-loop control of the power distribution equipment 163. The control function may use power distribution system information communicated to the industrial automation control network 101 to provide the closed-loop control. In one embodiment, the power distribution system information includes one or more dynamic AFC thresholds. The dynamic AFC thresholds may be used to provide the closed-loop control as will be described hereafter.

The power distribution system information may be communicated over the industrial automation control network 101 and/or the network 157 to one or more of the process controller 151 and the power monitor 153. The process controller 151 may employ the power distribution system information to control one or more processes. The power monitor 153 may employ the power distribution system information to monitor power consumption in the industrial automation control network 101.

In one embodiment, the control function interfaces to the process controller 151. In addition, the control function may interface to the process controller 151 via the user configurable add-on profile 159. The add-on profile 159 may be a Graphical User Interface (GUI). In one embodiment, the control function may allow a user to control the process controller 151 using the add-on profile 159. In a certain embodiment, the user may set a dynamic AFC threshold that is used to control the AFC as will be described hereafter. The control function and/or the controller 150 may control the AFC in the process controller 151 to the dynamic AFC threshold as will be described hereafter.

In one embodiment, the control function comprises communicating the AFC to the system controller 150. In addition, the controller 150 may initiate the control function based on the AFC.

Figure 1C:
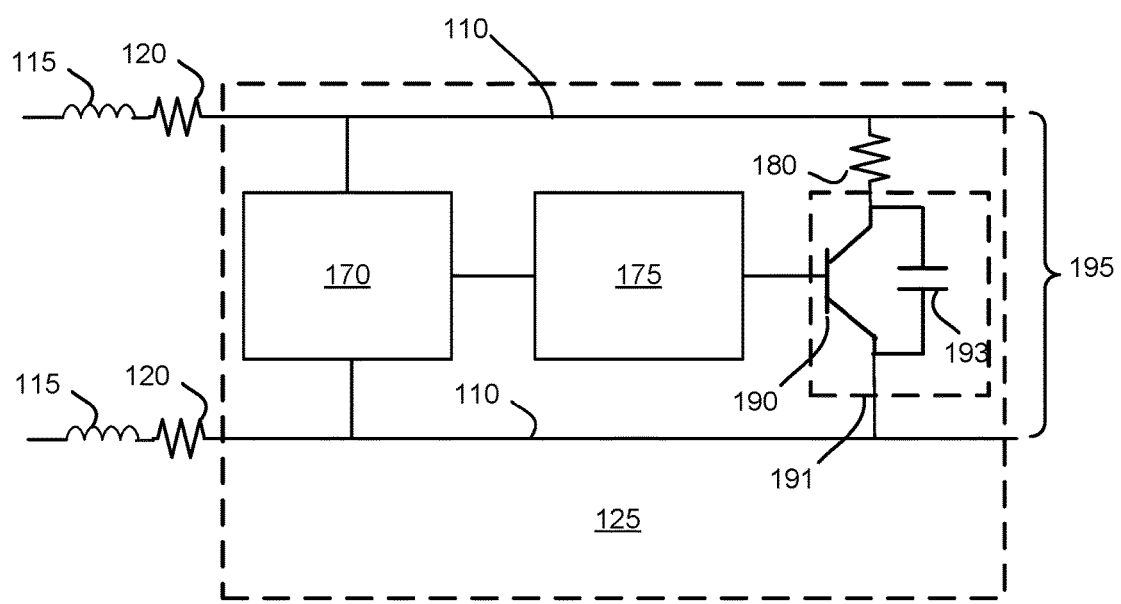
FIG. 1C is a schematic block diagram of a measurement module according to an embodiment.

FIG. 1C is a schematic block diagram of the measurement module 125 according to an embodiment. The measurement module 125 may measure the operating voltage, the short voltage, and the ring parameter of the power lines 110. In the depicted embodiment, the measurement module 125 includes a voltage measurement module 170, a measurement controller 175, a short resistor 180, and a switch 191. In the depicted embodiment, the switch 191 also includes a solid-state switch 190 and a capacitor 193.

The voltage measurement module 170 may measure the voltage 195 between the power lines 110 as the operating voltage. The measurement controller 175 may further activate the switch 191 to drain the current from the power lines 110 by shorting the power lines 110 across the short resistor 180. The voltage measurement module 170 may measure the voltage 195 as the short voltage.

The measurement controller 175 may terminate the short across the short resistor 180 by opening the switch 191. Terminating the short may generate a resonant ring in the power lines 110. The voltage measurement module 170 may measure a ring parameter of the resident ring caused by terminating the short. The ring parameter may be a frequency of the resonant ring. In one embodiment, the ring parameter includes a pulse width of a voltage spike of the resonant ring. In addition, the ring parameter may include an amplitude of the voltage spike of the resonant ring.

Figure 1D:
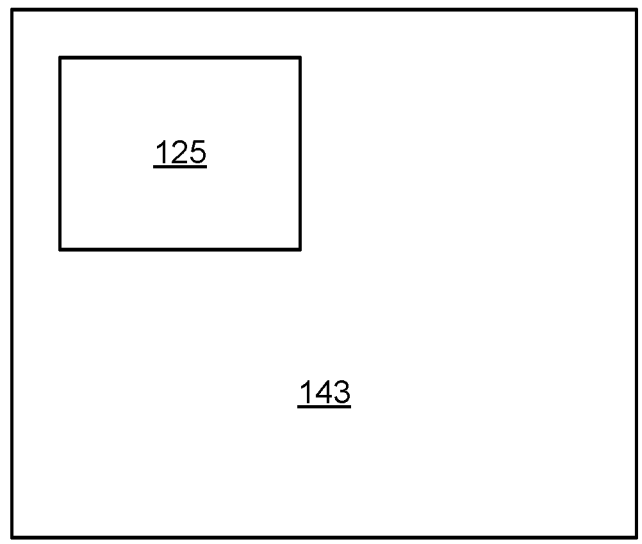
FIG. 1D is a schematic block diagram of an enclosure according to an embodiment.

FIG. 1D is a schematic block diagram of an enclosure 143 according to an embodiment. In the depicted embodiment, the measurement module 125 is disposed within the enclosure 143. The enclosure 143 may be selected from the group consisting of a stand-alone National Electrical Manufacturers Association (NEMA) Motor Control Center (MCC) bucket, a main compartment of the NEMA MCC bucket, a stand-alone International Electrotechnical Commission (IEC) MCC bucket, a main compartment of the IEC MCC, and a portable instrument.

Figure 1E:
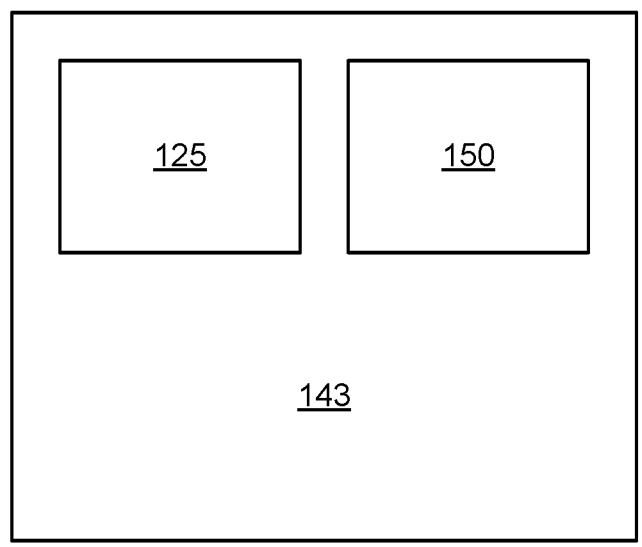
FIG. 1E is a schematic block diagram of an enclosure according to an alternate embodiment.

FIG. 1E is a schematic block diagram of the enclosure 143 according to an alternate embodiment. In the depicted embodiment, the enclosure 143 includes the measurement module 125 and the system controller 150.

Figure 2A:
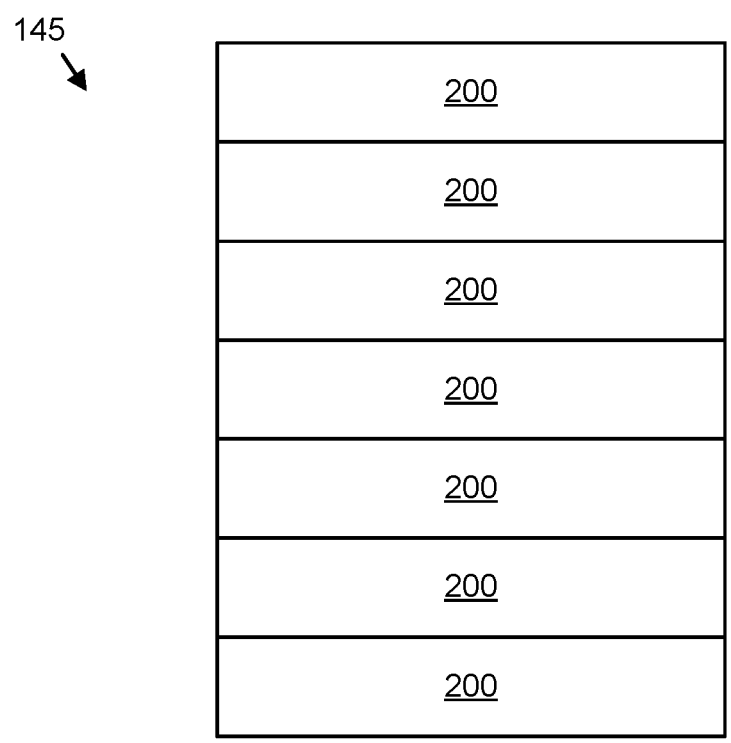
FIG. 2A is a schematic block diagram of a measurement database according to an embodiment.

FIG. 2A is a schematic block diagram of the measurement database 145 according to an embodiment. The measurement database 145 may store measurements from the measurement module 125. The measurement database 145 may be organized as a data structure in a memory. In the depicted embodiment, the measurement database 145 includes one or more measurement entries 200.

Figure 2B:
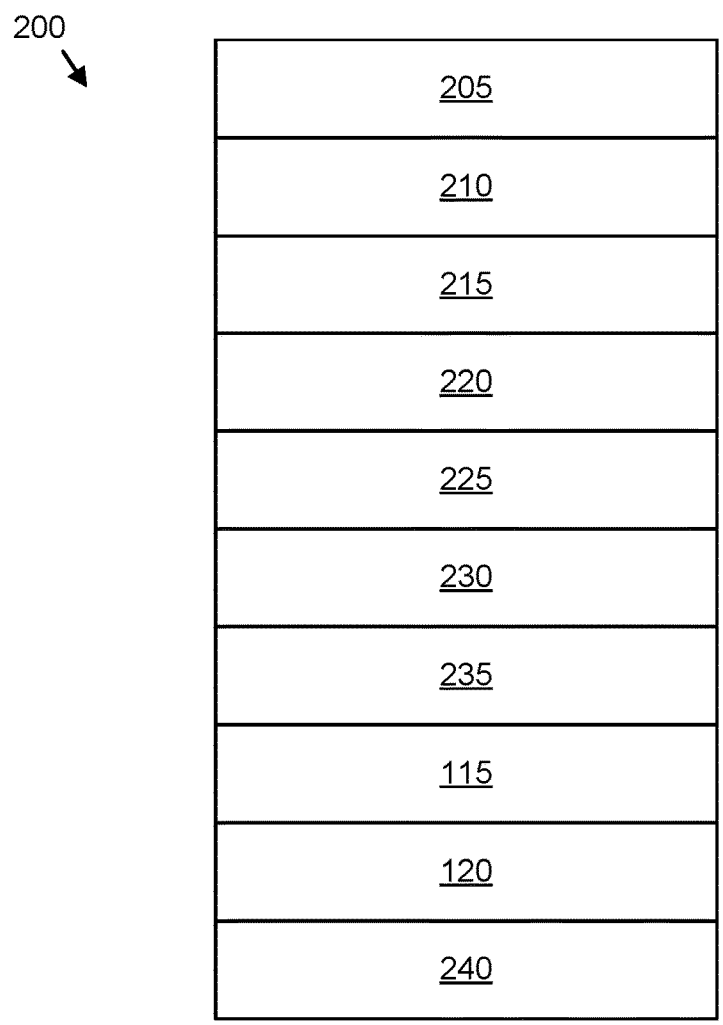
FIG. 2B is a schematic block diagram of a measurement entry according to an embodiment.

FIG. 2B is a schematic block diagram of the measurement entry 200 according to an embodiment. The measurement entry 200 may store data from a single measurement instance made by the measurement module 125. In the depicted embodiment, the measurement entry 200 includes a measurement module identifier 205, a power line identifier 210, a current-using event identifier 215, the operating voltage 220, the short voltage 225, the ring parameter 230, a measurement timestamp 235, the reactance 115, the resistance 120, and the AFC 240.

The measurement entry 205 may uniquely identify the measurement module 125 that generates the measurements of the measurement entry 205. The power line identifier 210 may identify the power line 110 on which the measurement module 125 makes the measurements.

The current-using event identifier 215 may identify a current-using event in the power distribution system 100. A current-using event may include the activation of a load 105, the activation of an industrial device 161, the closing of a switch 135 to supply power to a load 105, the tripping of a breaker 140, and the like. The current-using event identifier 215 may be used to correlate measurements from the measurement module 205 with current-using events as will be described hereafter.

The operating voltage 220 is the voltage 195 measured by the voltage measurement module 170 with the switch 191 open. The short voltage 225 is the voltage 195 measured by the voltage measurement module 170 with the switch 191 closed.

The ring parameter 230 may comprise a plurality of voltages 195 that are measured by the measurement module 170 after the switch 191 is opened, generating a resonant ring on the power line 110. In one embodiment, the ring parameter 230 is the frequency of the resonant ring. The reactance 115 and the resistance 120 may be calculated using the operating voltage 220, the short voltage 225, and/or the ring parameter 230 as will be described hereafter.

The measurement timestamp 235 may record when the measurements of the measurement entry 200 were recorded. The AFC 240 may record the AFC calculated from the measurements.

Figure 2C:
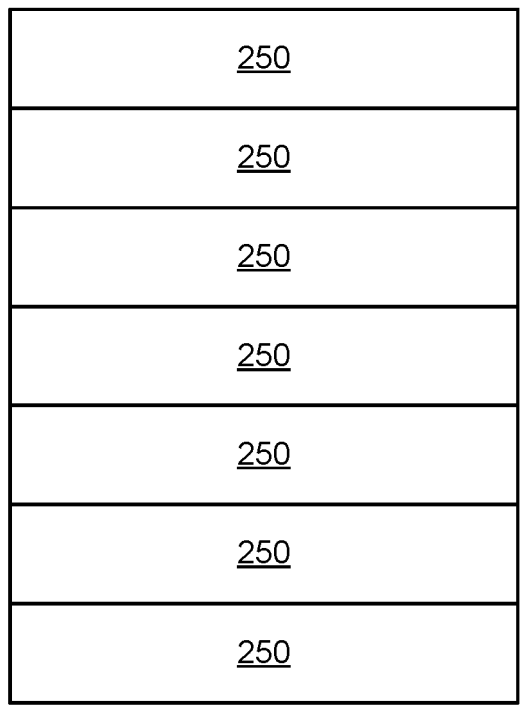
FIG. 2C is a schematic block diagram of a current-using database according to an embodiment.

FIG. 2C is a schematic block diagram of the current-using database 185 according to an embodiment. The current-using database 185 may record current-using events that occur in the power distribution system 100. The current-using database 185 may be organized as a data structure in a memory. In the depicted embodiment, the current-using database 185 includes a plurality of current-using event entries 250.

Figure 2D:
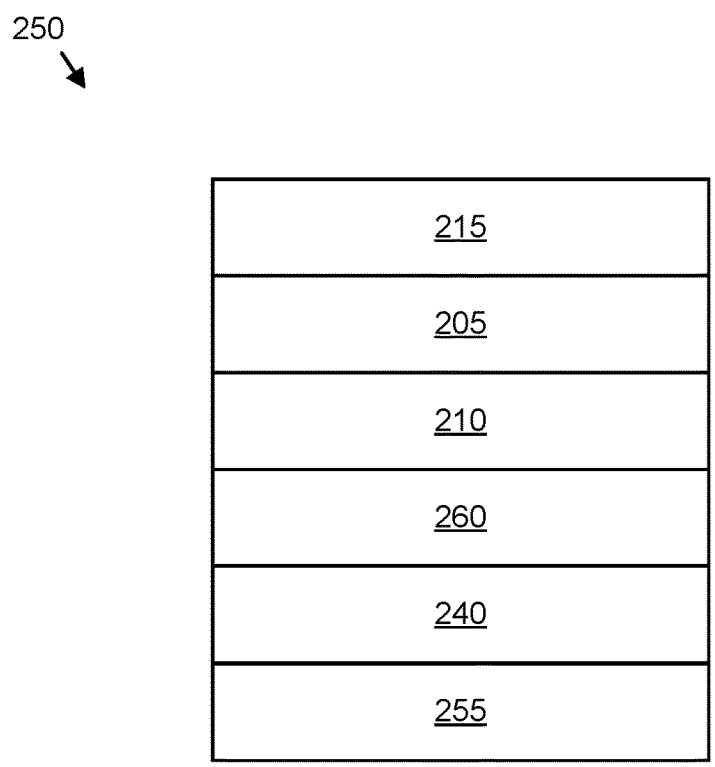
FIG. 2D is a schematic block diagram of a current-using event entry according to an embodiment.

FIG. 2D is a schematic block diagram of a current-using event entry 250 according to an embodiment. The current-using event entry 250 may record a current-using event. In the depicted embodiment, the current-using event entry 250 includes the current-using event identifier 215, the measurement module identifier 205, the power line identifier 210, an event timestamp 260, the AFC 240, and a current-using event 255.

The event timestamp 260 may record when the current-using event 255 occurs. The current-using event 255 may describe the current-using event in the power distribution system 100. The AFC 240 may record the AFC associated with the current-using event 255.

Figure 2E:
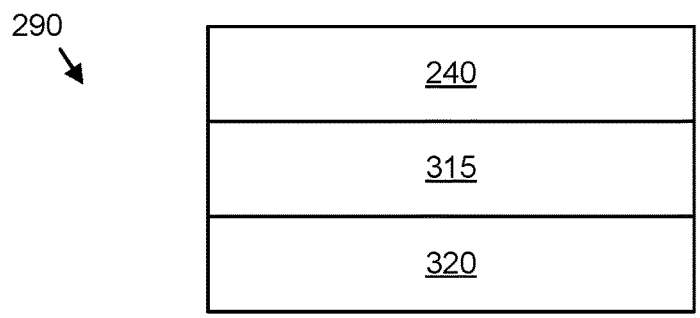
FIG. 2E is a schematic block diagram of power distribution system information according to an embodiment.

FIG. 2E is a schematic block diagram of the power distribution system information 290 according to an embodiment. The power distribution system information 290 maybe organized as a data structure in a memory and/or in a message. In one embodiment, the message is organized using one or more of Class 1 and Class 3 message schemes.

In the depicted embodiment, the power distribution system information 290 includes the AFC 240, a control signal 315, and a dynamic AFC threshold 320. The AFC 240 is dynamically calculated in real time. In one embodiment, the control signal 315 is generated in response to the AFC 240. In a certain embodiment, the control signal 315 is generated to hold the AFC 240 within the dynamic AFC threshold 320 as will be described hereafter.

Figure 3A:
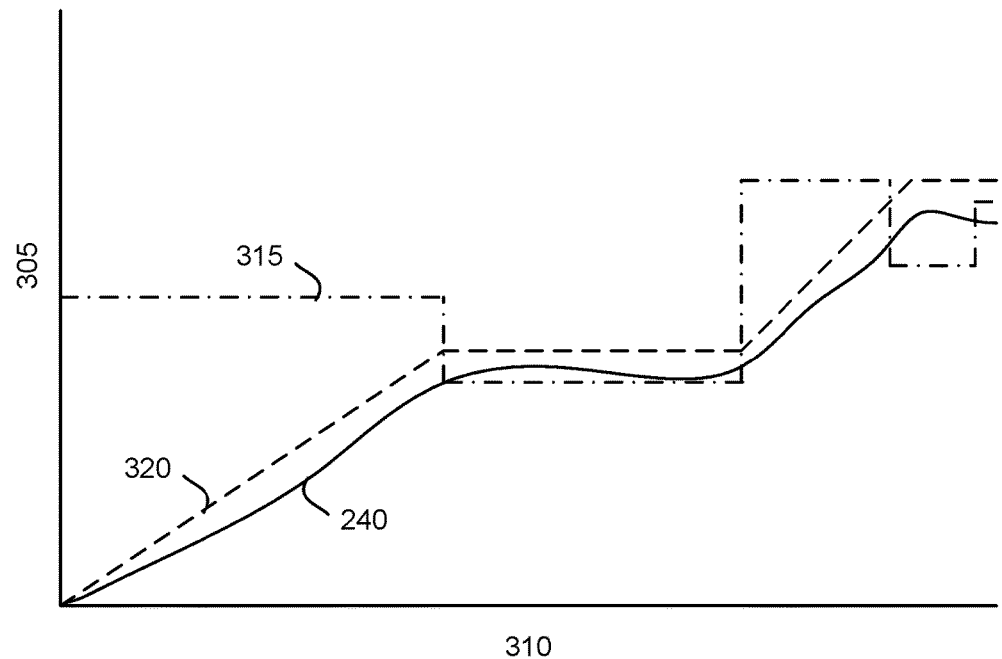
FIG. 3A is a graph of a control function according to an embodiment.

FIG. 3A is a graph of a control function according to an embodiment. The graph shows the current 305 of the AFC 240 in the power distribution system 100 over time 310. In the depicted embodiment, the control function comprises a control signal 315. The control signal 315 may control one or more of the supply 130 and the switch 135 to supply current 305 to the load 105. In addition, the control signal 315 may be communicated as a message to one or more of the add-on profile 159, process controller 151, power monitor 153, industrial device 161, and power distribution equipment 163. In one embodiment, one or more of the control signal 315, the AFC 240, and the dynamic AFC threshold 320 are communicated as a message comprising the power distribution system information 290.

In one embodiment, the control function comprises holding the AFC 240 within a dynamic AFC threshold 320. In the depicted embodiment, the control signal 315 controls the current 305 of the supply 130. The control signal 315 is dynamically modified to hold the dynamically calculated AFC 240 within the dynamic AFC threshold 320.

By dynamically calculating the AFC 240, the control function provides closed-loop control of the power distribution system 100, the power distribution equipment 163, the process controller 151, the power monitor 153, and/or the industrial device 161.

Figure 3B:
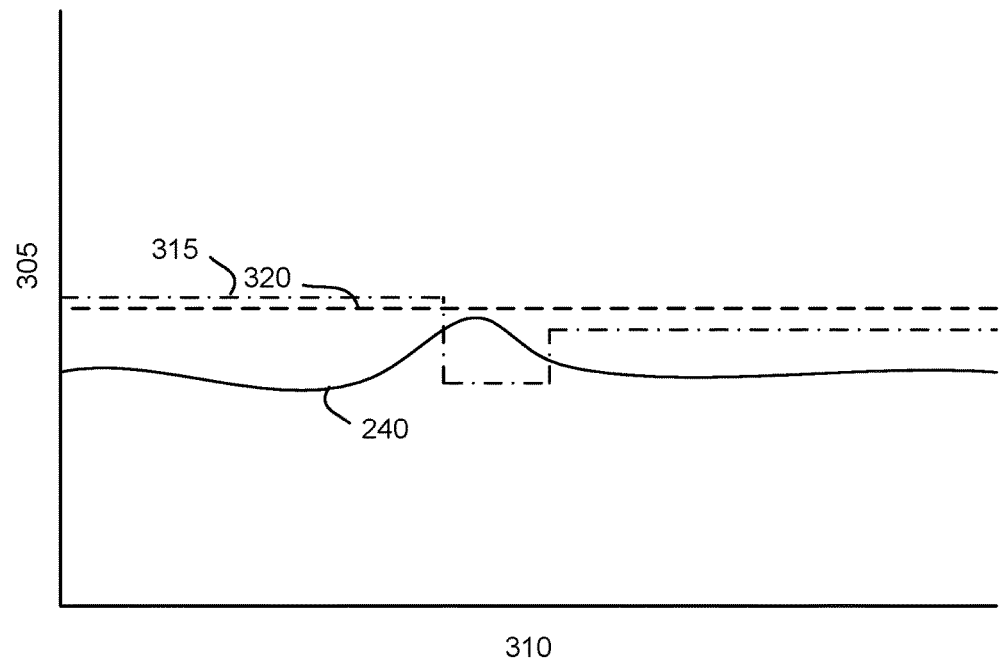
FIG. 3B is a graph of an alternate control function according to an embodiment.

FIG. 3B is a graph of an alternate control function according to an embodiment. The graph shows the current 305 provided by the supply 130 over time 310. In the depicted embodiment, the control function comprises minimizing the AFC 240 in the power distribution system 100. The power distribution system 100 may have a dynamic AFC threshold 320 that is a maximum rated AFC 240. The control function may generate the control signal 315 for the supply 130, process controller 151, industrial device 161, and/or power distribution equipment 163 so the AFC 240 does not exceed the dynamic AFC threshold 320. Because of the dynamic control of the AFC 240, the power distribution system 100 may employ lower tolerance, lower-cost components without exceeding maximum AFC levels. In addition, dynamically controlling the AFC 240 allows for the more efficient control and operation of the power distribution system 100.

Figure 4A:
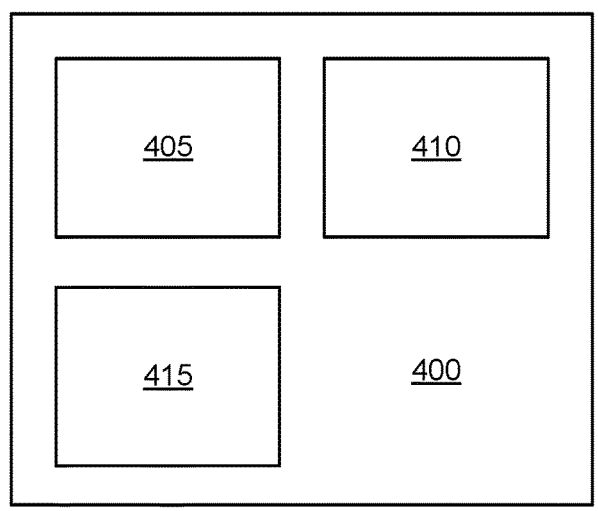
FIG. 4A is a schematic block diagram of a controller according to an embodiment.

FIG. 4A is a schematic block diagram of a controller 400 according to an embodiment. The controller 400 may be embodied in one or more of the system controller 150, the add-on profile 159, the process controller 151, the power monitor 153, the industrial device 161, and/or the power distribution equipment 163. In the depicted embodiment, the controller 400 includes a processor 405, a memory 410, and control hardware 415. The memory 410 may include a semiconductor storage device, a hard disk drive, an optical storage device, a micromechanical storage device, or combinations thereof. The memory 410 may store code. The processor 405 may execute the code. The control hardware 415 may control other devices as directed by the processor 405.

Figure 4B:
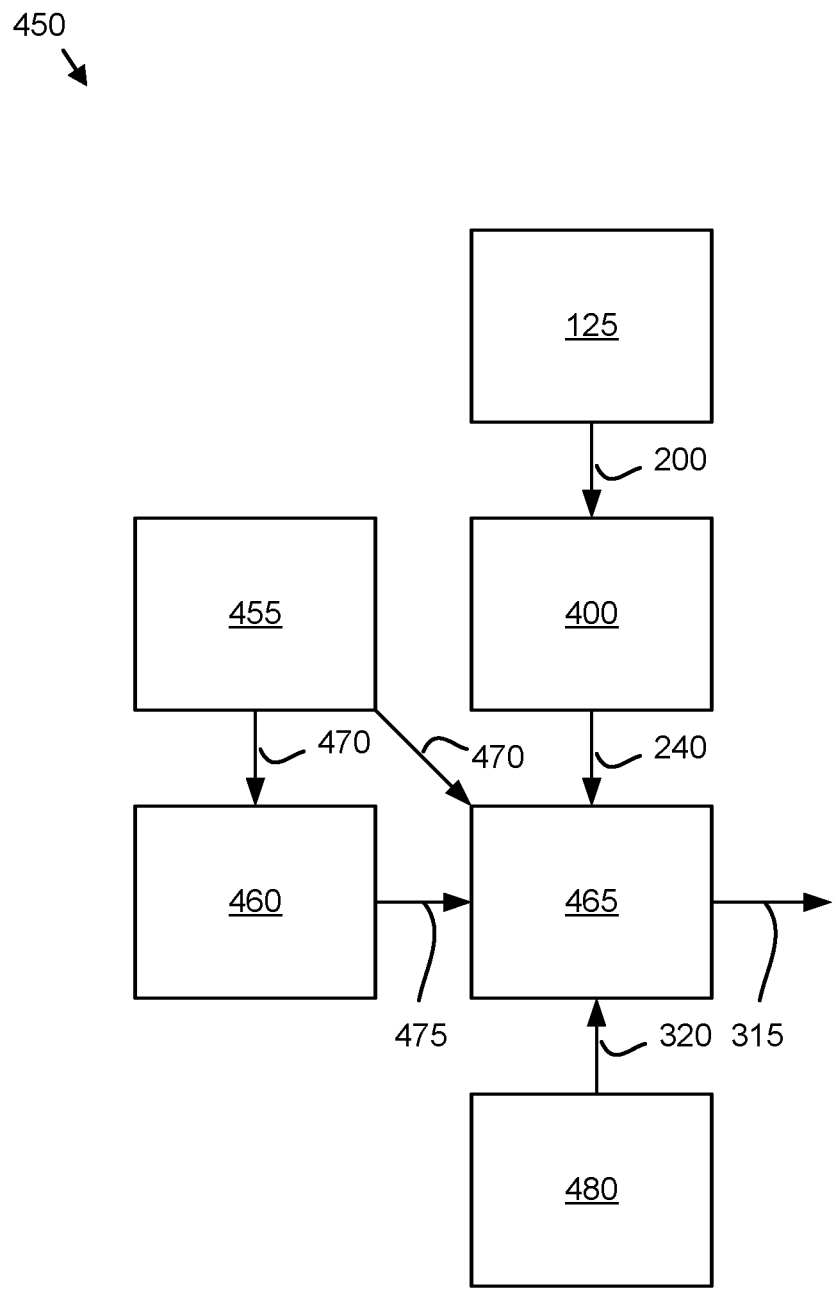
FIG. 4B is a schematic block diagram of a control process according to an embodiment.

FIG. 4B is a schematic block diagram of a control process 450 according to an embodiment. The control process 450 may be embodied in the controller 400. In the depicted embodiment, the control function 450 includes a control input 455, a current usage model 460, the controller 400, one or more measurement modules 125, system limits 480, and the control function 465.

The control input 455 may be user controls on one or more of the system controller 150, add-on profile 159, process controller 151, power monitor 153, industrial device 161, and/or power distribution equipment 163. The control input 455 may generate a control action 470. The control action 470 may be evaluated using the current usage model 460 to generate a predicted AFC 475. The current usage model 460 may estimate the predicted AFC 475 for each current-using event 255. The current usage model 460 may be determined for each current-using event 255 as a function of the AFC 240.

The system limits 480 may specify one or more dynamic AFC limits 320. The dynamic AFC limits 320 may be defined by component tolerances, safety requirements, or combinations thereof.

The measurement modules 125 may generate the measurement entry 200. The controller 400 may calculate the AFC 240 using the measurement entry 200. The control function 465 may employ the control action 470, the predicted AFC 475, the dynamic AFC threshold 320, and the AFC 240 to determine the control signal 315.

Figure 5A:
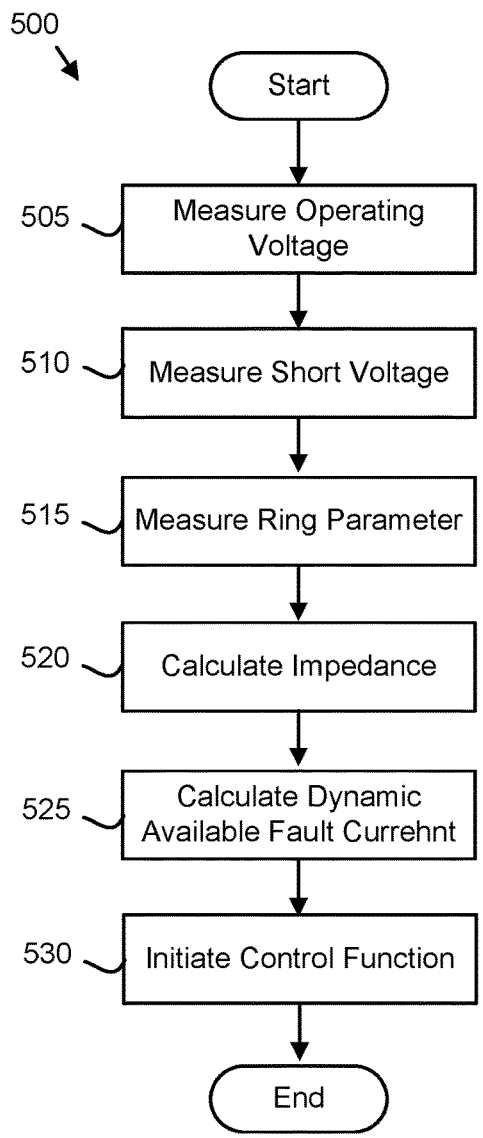
FIG. 5A is a flow chart diagram of a control function initiation method according to an embodiment.

FIG. 5A is a flow chart diagram of a control function initiation method 500 according to an embodiment. The method 500 may initiate the control function 465 based on the AFC 240. The method 500 may be performed by the measurement module 125 and/or a processor 405 of one or more of the system controller 150, the process controller 151, the industrial device 161, and the power distribution equipment 163.

The method 500 starts, and in one embodiment, the measurement module 125 measures 505 the operating voltage 220 of a power line 110. In addition, the measurement module 125 may measure 510 the short voltage 225 of the power line 110. The measurement module 125 may further measure 515 the ring parameter 230 on the power line 110. In one embodiment, the measurement module 125 obtains the operating voltage 220, short voltage 225, and ring parameter 230 measurements as directed by the processor 405.

The processor 405 may calculate 520 an impedance of the power line 110. In one embodiment, the impedance L is calculated using Equation 1, where CLoad is a known capacitive load, RLoad is a known resistive load, and f is a frequency of the resonant ring.

$$L = \frac{\frac{1}{CLoad} + \sqrt{\frac{1}{CLoad^2} - (2\pi f)^2 Rload^2}}{2(2\pi f)^2}$$

Equation 1

In addition, the processor 405 may calculate 520 the resistance 120 for the power line 110. In one embodiment, the resistance R 120 is calculated using equation 2, where $V_o$ is the operating voltage 220 and $V_r$ is the short voltage.

$$R = \sqrt{\frac{(V_o RLoad)^2 - (V_r 377L)^2}{V_r^2}} - RLoad$$

Equation 2

The processor 405 may calculate 525 a dynamic AFC 240 as a function of the reactance 115 and/or resistance 120. In addition, the processor 405 may calculate 525 the dynamic AFC 240 as a function of the reactance 115, the resistance 120, and the operating voltage 220. The dynamic AFC 240 may be calculated using Equation 3, where Z is the impedance as a function of L and R.

$$AFC = V_O/Z$$

Equation 3

The processor 405 may further initiate 530 the control function 465 and the method 500 ends. The initiation 530 of the control function 465 is described in more detail in FIGS. 5B-D.

Figure 5B:
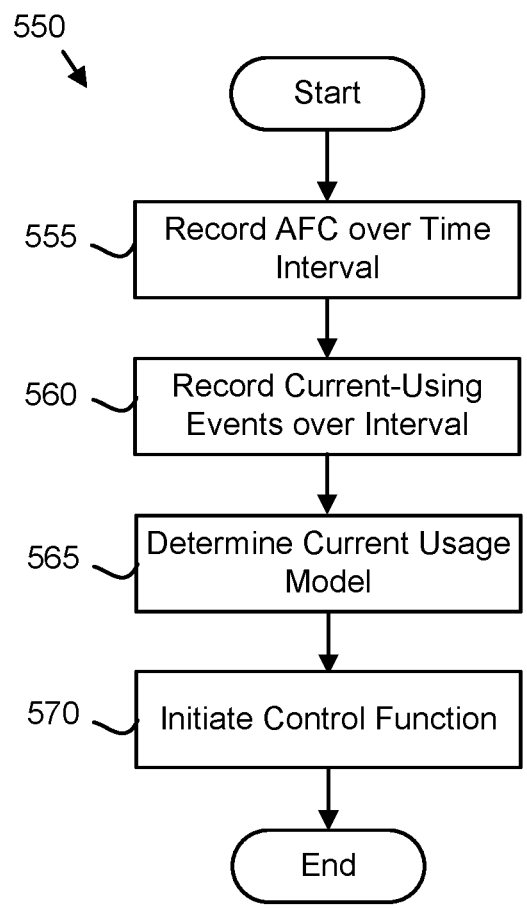
FIG. 5B is a flow chart diagram of a control function initiation method based on a current usage model according to an embodiment.

FIG. 5B is a flow chart diagram of a control function initiation method 550 based on the current usage model 460 according to an embodiment. The method 550 may initiate the control function 465 based on the current usage model 460. The method 550 may be performed by the processor 405 of one or more of the system controller 150, the process controller 151, the industrial device 161, and the power distribution equipment 163.

The method 550 starts, and in one embodiment, the processor 405 records 555 the AFC 240 over a time interval. The AFC 240 may be recorded 555 to a current-using event entry 250 of the current-using event database 185. The processor 450 may further record 560 the current-using event 255 over the time interval. The current-using event 255 may be recorded 560 to the current-using entry 250.

The processor 405 may determine 565 the current usage model 460 for each current-using event 255 as a function of the AFC 240. The current usage model 460 may estimate the AFC 240 for each current-using event 255 and/or combinations of current-using events 255.

In one embodiment, the current usage model 460 is defined by a training matrix T as shown in Equation 4 for j instances of current from the supply, current-using events 255, and calculated AFC 240, where each $c_j$ is current from the supply 130 for instance j, $e_{j,i}$, is current-using event i 255 for instance j, and $k_{j,i}$ is an AFC instance i 240 for instance j.

$$T = \begin{bmatrix} c_0 & e_{0,0} & \cdots & e_{0,i} & k_{0,0} & \cdots & k_{0,i} \\ \vdots & \vdots & \ddots & \vdots & \vdots & \ddots & \vdots \\ c_j & e_{j,0} & \cdots & e_{j,i} & k_{j,0} & \cdots & k_{j,i} \end{bmatrix}$$

Equation 4

The training matrix T may be fit to a model M as shown in Equation 5 to determine 565 the current usage model CM 460.

$$CM = M.\text{fit}(T)$$

Equation 5

The Model M may be a statistical model. In addition, the Model M may be a quadratic equation. In one embodiment, the Model M is a neural network. Alternatively, Model M may be a deterministic circuit model derived from the power distribution system 100.

In one embodiment, the processor 405 initiates 570 the control function 465 based on the AFC 240 and the current usage model 460 and the method 550 ends. For example, the processor 405 may measure the AFC 240 for one or more power lines 110 in the power distribution system 100. The processor 405 may further identify one or more current-using events 255. In addition, the processor 405 may measure the current of the supply 130. The processor 405 may generate an input matrix X from the measured present AFC 240, current-using events 255, and current of the supply 130, as shown in Equation 6. The input matrix X may be a sparse matrix.

$$X = [c\ e_0\ \ldots\ e_i\ k_0,\ \ldots\ k_i]$$
Equation 6

The processor 405 may predict at least one predicted AFC 475 in prediction matrix Y using the input matrix X, as shown in Equation 7.

$$Y = CM.predict(X)$$
Equation 7

In one embodiment, the control function 465 generates the control signal 315 based on the measured and/or predicted AFC 240 and the current usage model 460. For example, the control signal CS 315 may be calculated using Equation 8, where FUN is the control function 465, AFC is the measured AFC 240, CA is the control action 470, and DT is the dynamic AFC threshold 320.

$$CS = FUN(Y, AFC, CA, DT)$$
Equation 8

The control function 465 may minimize the AFC 240 in the power distribution system 110. In addition, the control function 465 may hold the AFC 240 within the dynamic AFC threshold 320. Other control functions 465 are described in more detail in FIG. 5D.

Figure 5C:
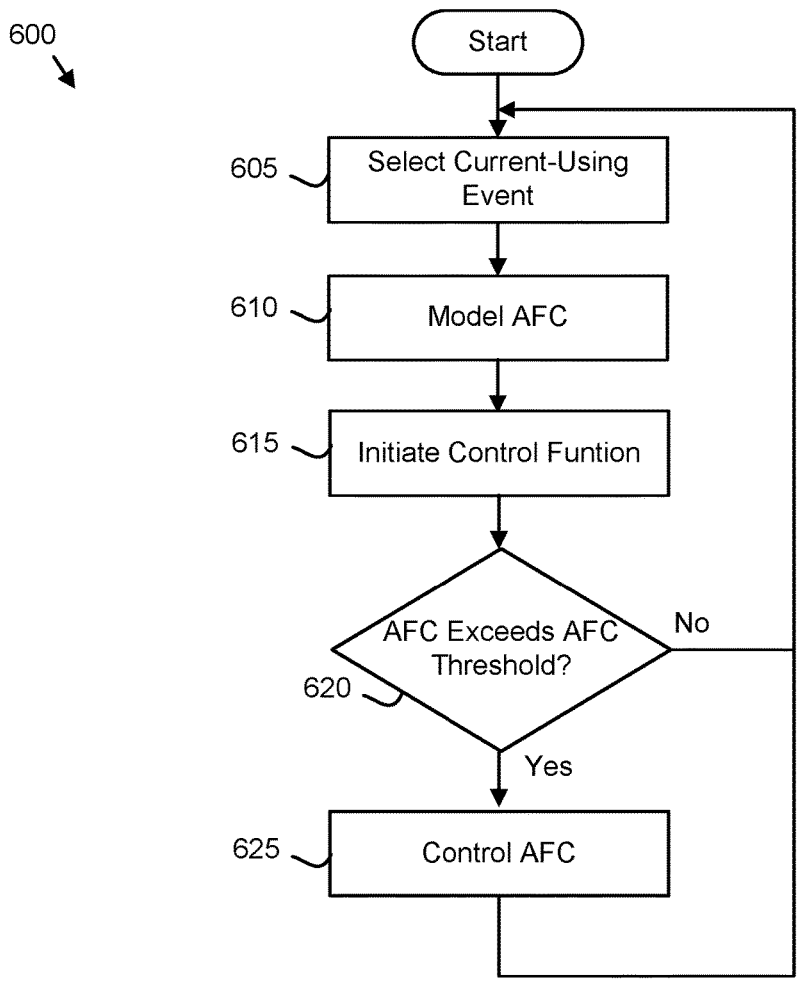
FIG. 5C is a flow chart diagram of an Available Fault Current (AFC) control method according to an embodiment.

FIG. 5C is a flow chart diagram of an AFC control method 600 according to an embodiment. The method 600 may control the AFC 240 within the dynamic AFC threshold 320. The method 600 may be performed by the processor 405 of one or more of the system controller 150, the process controller 151, the industrial device 161, and the power distribution equipment 163.

The method 600 starts, and in one embodiment, the processor 405 selects 605 a current-using event 255. The selected current-using event 255 may be incorporated in a command from the add-on profile 159. Alternatively, the selected current-using event 255 may be incorporated in a message from the process controller 151, the power monitor 153, the industrial device 161, and/or the power distribution equipment 163 comprising a notification of the current-using event 255. In one embodiment, the system controller 150 generates the selected current-using event 255.

The processor 405 may model 610 the AFC 240 for the current-using event 255 and/or each combination of current-using events 255. In one embodiment, the predicted AFC 475 in the power distribution system 100 are modeled using a current usage model 460 that is a linear regression of the one or more current-using events 255 and/or the one or more AFC 240 as shown in Equation 9, where $a_i$ and $b_i$ are nonzero constants.

$$AFC = a_0 c_0 + a_i e_0 + \ldots + a_i e_i + b_i e_0 + \ldots b_i e_i$$
Equation 9

The processor 405 may initiate 615 the control function 465 based on the predicted AFC 475 and the current usage model 460. In one embodiment, the control function 465 determine 620 if the predicted AFC 475 of the current usage model 460 are expected to exceed the dynamic AFC threshold 320. If the predicted AFC 475 is not expected to exceed the dynamic AFC threshold 320, the processor 405 may continue to select 605 current-using events 255. If the predicted AFC 475 are expected to exceed the dynamic AFC threshold 320, the control function 465 may control 625 the AFC 240. In one embodiment, the control function 465 modifies the control signal 315 to control 625 the AFC 240.

As a result, current-using events 255 that are expected to cause the AFC 240 to exceed the dynamic AFC threshold 320 may be controlled so that the dynamic AFC threshold 320 is not exceeded.

Figure 5D:
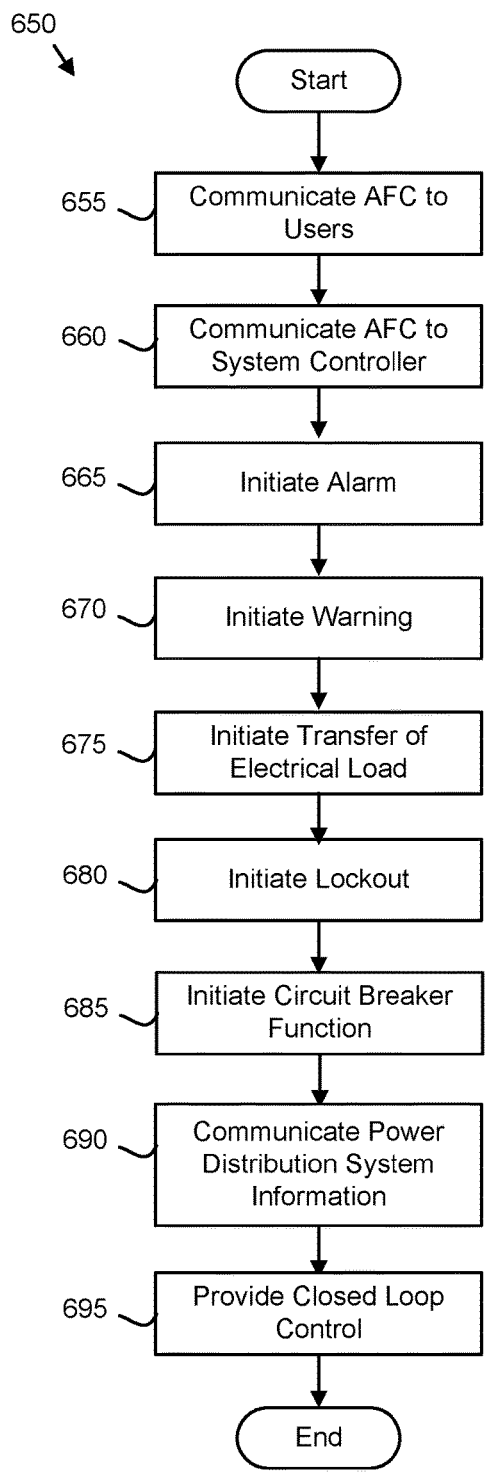
FIG. 5D is a flow chart diagram of a control function method according to an embodiment.

FIG. 5D is a flow chart diagram of a control function method 650 according to an embodiment. The method 650 may perform the control function 465. The method 650 may perform any or all of the described control functions 465. The method 650 may be performed by the processor 405 of one or more of the system controller 150, the process controller 151, the industrial device 161, and the power distribution equipment 163.

The method 650 starts, and in one embodiment, the processor 405 communicates 655 the AFC 240 to the user. The AFC 240 may be communicated 655 to the user through the add-on profile 159. In addition, the AFC 240 may be communicated 655 to the user through the power monitor 153. In a certain embodiment, the AFC 240 is communicated 655 through the display 167.

The processor 405 may further communicate 660 the AFC 240 to the system controller 150. In addition, the AFC 240 may be communicated 660 to the process controller 151, the industrial device 161, and/or the power distribution equipment 163.

The processor 405 may initiate 665 the alarm 155. The processor 405 may initiate 665 the alarm 155 in response to the AFC 240 exceeding the dynamic AFC threshold 320. In one embodiment, the processor 405 communicates a message to the alarm 155 to initiate 665 the alarm 155.

The processor 405 may further initiate 670 the warning 160. The processor 405 may initiate 670 the warning 160 in response to the AFC 240 exceeding the dynamic AFC threshold 320. The processor 405 may initiate 670 the warning 160 by communicating a message to the warning 160 to initiate the warning 160.

In one embodiment, the processor 405 initiates 675 a transfer of an electrical load. The processor 405 may open a switch 135 to transfer the electrical load. The transfer may be part of a load shedding operation. Alternatively, the processor 405 may transfer the electrical load by decreasing the electrical load such as by slowing a motor.

The processor 405 may initiate 680 the lockout 165. The lockout 165 may prevent the operation of the power distribution system 100, a load 105, the process controller 151, the industrial device 161, and/or the power distribution equipment 163. In one embodiment, the lockout 165 restricts power. Alternatively, the lockout 165 may restrict physical access by a user.

The processor 405 may initiate 685 a circuit breaker function of the circuit breaker 140. The circuit breaker function may comprise one or more of tripping the circuit breaker 140, toggling a binary control of the circuit breaker 140, and adjusting protection settings of the circuit breaker 140. In one embodiment, adjusting the protection settings of the circuit breaker 140 includes entering a maintenance mode for the circuit breaker 140. The circuit breaker 140 may isolate a portion of the power distribution system 100.

The processor 405 may communicate 690 the power distribution system information 290. In one embodiment, the power distribution system information 290 is communicated over the network 157. The power distribution system information 290 may be received by one or more of the system controller 150, the add-on profile 159, the process controller 151, the power monitor 153, the industrial device 161, and the power distribution equipment 163.

In one embodiment, the processor 405 provides 695 closed-loop control for the power distribution system 100 and the method 650 ends. The processor 405 may modify the control signal 315 so that the AFC 240 is held within the dynamic AFC threshold 320 as described in FIGS. 3A-B.

Problem/Solution

AFC related protections and controls have traditionally been based on static AFC estimates. As a result, the components of the power distribution system 100 have been designed to cope with worst-case AFC, greatly increasing the cost of the system 100. Otherwise, the AFC might exceed a component's tolerances.

In addition, because the AFC has only been estimated, control functions for the power distribution system 100 are typically very conservatively designed. As discussed above, a conservative design for AFC increases component cost. However, a design based on static AFC often also forces the system 100 to be designed with very conservative responses to controls. As a result, system 100 performance must be reduced or component costs increased.

The embodiments described herein calculate the impedance of the power lines 110 as a function of the operating voltage 220, the short voltage 225, and the ring parameter 230 measured by the measurement module 125. The embodiments initiate a control function 465 based on the dynamically calculated AFC 240. The control function 465 may dynamically control the AFC 240 in the power distribution system 100. As a result, the power distribution system 100 may be constructed to less stringent requirements, reducing its cost.

The embodiments may also dynamically control the AFC 240 in response to current-using events 255. For example, the starting of a motor load 105 may significantly increase the AFC 240 in a power line 110. The embodiments may control the starting of the load to maintain the AFC 240 within the dynamic AFC threshold 320. As a result, the operation of the power distribution system 100 may operate with reduced fluctuations of the AFC 240. In addition, the power distribution system 100 may mitigate dangerous spikes in AFC 240.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
 a measurement module that measures an operating voltage, a short voltage, and a ring parameter of Alternating Current (AC) power lines;
 a processor that:
 calculates an impedance of the power lines as a function of the operating voltage, the short voltage, and the ring parameter;
 records a plurality of available fault currents over a time interval as a function of the impedance;
 records a plurality of current-using events over the time interval;
 determines a current usage model as a training matrix T for each current-using event that models the plurality of available fault currents as a function of the plurality of current-using events; and
 initiates a control function based on an available fault current predicted by the currant usage model.

2. The apparatus of claim 1, wherein the control function comprises minimizing the available fault current in a power distribution system.

3. The apparatus of claim 1, wherein the control function comprises holding the available fault current within a dynamic available fault current threshold.

4. The apparatus of claim 1, wherein the control function comprises communicating the available fault current to a display.

5. The apparatus of claim 1, wherein control function comprises communicating the available fault current to a system controller.

6. The apparatus of claim 1, wherein the control function comprises one or more of an alarm, a warning, and a lockout.

7. The apparatus of claim 1, wherein the control function comprises initiating transfer of an electrical load.

8. The apparatus of claim 1, wherein control function is a circuit breaker function comprising one or more of tripping a circuit breaker, toggling a binary control of the circuit breaker and adjusting protection settings of the circuit breaker.

9. The apparatus of claim 8, wherein the circuit breaker function isolates a portion of a power distribution system.

10. The apparatus of claim 1, wherein the measurement module measures an operating voltage between the power lines, drains current from the power lines by shorting the power lines across a short resistor, measures a short voltage across the short resistor shorting the power lines, terminates the short across the short resistor, and measures a ring parameter of a resonant ring caused by terminating the short.

11. The apparatus of claim 1, wherein the control function comprises providing closed loop control of power distribution equipment using power distribution system information communicated to an industrial automation control network.

12. The apparatus of claim 11 wherein the power distribution system information is communicated over the industrial automation control network to one or more of a process controller and a power monitor.

13. The apparatus of claim 11, wherein the control function interfaces to the process controller via a Graphical User Interface.

14. A method comprising:
 measuring an operating voltage, a short voltage, and a ring parameter of Alternating Current (AC) power lines;
 calculating, by use of a processor, an impedance of the power lines as a function of the operating voltage, the short voltage, and the ring parameter;
 recording a plurality of available fault currents over a time interval as a function of the impedance;
 recording a plurality of current-using events over the time interval;
 determining a current usage model as a training matrix T for each current-using event that models the plurality of available fault currents as a function of the plurality of current-using events; and
 initiates a control function based on an available fault current predicted by the currant usage model.

15. The method of claim 14, wherein control function is a circuit breaker function comprising one or more of tripping a circuit breaker, toggling a binary control of the circuit breaker and adjusting protection settings of the circuit breaker.

16. The method of claim 14, the method further comprising measuring an operating voltage between the power lines, draining current from the power lines by shorting the power lines across a short resistor, measuring a short voltage across the short resistor shorting the power lines, terminating the short across the short resistor, and measuring a ring parameter of a resonant ring caused by terminating the short.

17. A system comprising:
- a power distribution system comprising a supply and a plurality Alternating Current (AC) power lines;
- a measurement module that measures an operating voltage, a short voltage, and a ring parameter of first power lines of the plurality of power lines;
- a processor that:
- calculates an impedance of the first power lines as a function of the operating voltage, the short voltage, and the ring parameter;
- records a plurality of available fault currents over a time interval as a function of the impedance;
- records a plurality of current-using events over the time interval;
- determines a current usage model as a training matrix T for each current-using event that models the plurality of available fault currents as a function of the plurality of current-using events; and
- initiates a control function based on an available fault current predicted by the currant usage model.

18. The system of claim 17, wherein control function is a circuit breaker function comprising one or more of tripping a circuit breaker, toggling a binary control of the circuit breaker and adjusting protection settings of the circuit breaker.

* * * * *